(12) United States Patent  
Boland

(10) Patent No.: US 9,079,569 B2
(45) Date of Patent: Jul. 14, 2015

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 1188 days.

(21) Appl. No.: 12/298,853

(22) PCT Filed: Apr. 23, 2007

(86) PCT No.: PCT/EP2007/053946
§ 371 (c)(1),
(2), (4) Date: Mar. 2, 2009

(87) PCT Pub. No.: WO2007/128677
PCT Pub. Date: Nov. 15, 2007

(65) Prior Publication Data
US 2009/0307862 A1 Dec. 17, 2009

(30) Foreign Application Priority Data

Apr. 28, 2006 (EP) .................................... 06113295

(51) Int. Cl.
*B60S 1/40* (2006.01)
*B60S 1/38* (2006.01)

(52) U.S. Cl.
CPC ............. *B60S 1/4038* (2013.01); *B60S 1/3806* (2013.01); *B60S 1/387* (2013.01); *B60S 1/3868* (2013.01); *B60S 2001/4051* (2013.01); *B60S 2001/4054* (2013.01)

(58) Field of Classification Search
CPC ................ B60S 2001/4051; B60S 2001/4054; B60S 1/4038; B60S 1/3806; B60S 1/3868; B60S 1/387

USPC ................ 15/250.3, 250.23, 250.31, 250.32, 15/250.34, 250.48, 250.351, 250.201, 15/250.361

See application file for complete search history.

(56) References Cited

U.S. PATENT DOCUMENTS

| 3,641,614 | A | * | 2/1972 | Newsome | 15/250.32 |
| 5,611,103 | A | * | 3/1997 | Lee | 15/250.32 |
| 6,779,223 | B1 | * | 8/2004 | Roekens | 15/250.32 |
| 7,774,892 | B2 | * | 8/2010 | Coughlin | 15/250.32 |
| 2004/0211021 | A1 | * | 10/2004 | Weber et al. | 15/250.32 |
| 2005/0039292 | A1 | * | 2/2005 | Boland | 15/250.32 |
| 2005/0177970 | A1 | * | 8/2005 | Scholl et al. | 15/250.32 |

(Continued)

FOREIGN PATENT DOCUMENTS

| DE | 102 12 441 A1 | 11/2003 |
| DE | 103 23 997 A1 | 6/2004 |

(Continued)

*Primary Examiner* — Joseph J Hail
*Assistant Examiner* — Henry Hong
(74) *Attorney, Agent, or Firm* — Robert L. Stearns; Dickinson Wright, PLLC

(57) ABSTRACT

A windscreen wiper device comprising a carrier element, as well as an elongated wiper blade of a flexible material, which windscreen wiper device comprises a connecting device for an oscillating arm, wherein the oscillating arm is pivotally connected to the connecting device about a pivot axis near one end, with the interposition of a joint part, with the special feature that the connecting device and the joint part are provided with mutually cooperating pivot means for pivotally connecting the joint part to the connecting device, the joint part having an at least substantially U-shaped cross-section at wherein the joint part comprises a recess in the base of the U-shaped cross-section for snappingly connecting the oscillating arm to the joint part.

15 Claims, 9 Drawing Sheets

(56) References Cited

U.S. PATENT DOCUMENTS

| | | | |
|---|---|---|---|
| 2006/0117515 A1* | 6/2006 | Fink et al. | 15/250.32 |
| 2006/0230571 A1* | 10/2006 | Son | 15/250.32 |
| 2007/0067941 A1* | 3/2007 | Huang | 15/250.32 |
| 2007/0220698 A1* | 9/2007 | Huang | 15/250.32 |
| 2007/0289079 A1* | 12/2007 | Van Bealen | 15/250.32 |
| 2010/0005609 A1* | 1/2010 | Kim | 15/250.32 |
| 2012/0144615 A1* | 6/2012 | Song et al. | 15/250.32 |

FOREIGN PATENT DOCUMENTS

| | | | | |
|---|---|---|---|---|
| EP | 1403156 A | | 3/2004 | |
| WO | WO-2004/028875 | * | 4/2004 | B60S 1/40 |

\* cited by examiner

WINDSCREEN WIPER DEVICE

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of the longitudinal strips are interconnected by a respective connecting piece, which windscreen wiper device comprises a connecting device for an oscillating arm, wherein the oscillating arm is pivotally connected to the connecting device about a pivot axis near one end, with the interposition of a joint part.

2. Related Art

Such a windscreen wiper device is known from European patent publication no. 1 403 156 of the same Applicant. This prior art windscreen wiper device is designed as a "yokeless" wiper device, wherein no use is made of several yokes pivotally connected to each other, but wherein the wiper blade is biased by the carrier element, as a result of which it exhibits a specific curvature. In this prior art windscreen wiper device the joint part comprises at least one resilient tongue engaging in a correspondingly shaped hole provided in the oscillating arm, wherein the resilient tongue is rotatable along an hinge axis between an outward position retaining the wiper blade onto the oscillating arm and an inward position releasing the wiper blade from the oscillating arm. In order to connect the wiper blade onto the oscillating arm, the resilient tongue is initially pushed in against a spring force—as if it were a push button—and
then allowed to spring back into the hole provided in the oscillating arm, thus snapping, that is clipping the resilient tongue into the hole. By subsequently pushing in again the resilient tongue against the spring force, the wiper blade may be released from the oscillating arm.

SUMMARY OF THE INVENTION

The object of the invention is to provide an alternative, improved windscreen wiper device.

In order to accomplish that objective, a windscreen wiper device of the type referred to in the introduction is characterized according to the invention in that the connecting device and the joint part are provided with mutually cooperating pivot means for pivotally connecting the joint part to the connecting device, the joint part having an at least substantially U-shaped cross-section at the location of its connection to the connecting device, wherein the joint part comprises a recess in the base of the U-shaped cross-section for snappingly connecting the oscillating arm to the joint part. The connecting device is preferably fixedly connected to the longitudinal strips through a welding, brazing ("soldering"), gluing or clamping operation.

In one preferred embodiment of a windscreen wiper device in accordance with the invention a resilient free end of the joint part can pivot about a hinge axis for snappingly connecting the oscillating arm to the joint part. Particularly, the resilient free end of the joint part can pivot about the hinge axis between a first position for mounting or dismounting a free end of the oscillating arm into or from the recess in the base of the U-shaped cross-section of the joint part, and a second position for connecting the free end of the of the oscillating arm to the joint part.

In another preferred embodiment of a windscreen wiper according to the invention the joint part comprises at least one protrusion extending laterally from a longitudinal side of the joint part, the protrusion hooking behind a correspondingly shaped protrusion on the oscillating arm for blocking a longitudinal movement of the wiper blade with respect to the oscillating arm. In order to connect the oscillating arm to the joint part the oscillating arm is preferably pivoted relative to the joint part in an inclined position with respect to the wiper blade, so that the protrusion on the joint part is hooking behind the correspondingly shaped protrusion on the oscillating arm, wherein the oscillating arm is pivoted back relative to the joint part in a parallel position with respect to the wiper blade, so that a free end of the oscillating arm is snapped in the recess at the free end of the joint part.

In another preferred embodiment of a windscreen wiper device in accordance with the invention the oscillating arm is provided with a stop abutting a free end of the joint part for blocking a longitudinal movement of the wiper blade with respect to the oscillating arm. Particularly, the oscillating arm has an at least substantially U-shaped cross-section at the location of its connection to the joint part, wherein the base of the U-shaped cross-section is provided with a protrusion acting as the stop, and wherein the protrusion is mounted in a recess provided on the free end of the joint part that abuts the protrusion. This enhances the retention of the connection device/joint part onto the oscillating arm in all possible directions, particularly both horizontally and vertically.

In another preferred embodiment of a windscreen wiper device according to the invention the joint part is detachably connected to the connecting device. More in particular, the joint part is detachably connected to the connecting device through a snapping/clipping operation.

In another preferred embodiment of a windscreen wiper device in accordance with the invention the joint part is connected to the second part by pivotally engaging protrusions of the second part, at the location of the pivot axis, in recesses provided in the joint part. These protrusions that function as bearing surfaces are spaced far apart, so that the forces exerted thereon will be relatively low. Preferably, the joint part has an at least substantially U-shaped cross-section at the location of its connection to the second part, wherein the joint part in each leg of the U-shaped cross-section is provided with a recess provided coaxially with the pivot axis. More in particular, the protrusions extend outwards on either side of the second part, wherein the protrusions are at least substantially cylindrical. In the alternative, the protrusions are at least substantially spherical or frusto-conical.

In another preferred embodiment of a windscreen wiper device according to the invention the joint part is connected to the second part by pivotally engaging protrusions of the joint part, at the location of the pivot axis, in recesses provided in the second part. Particularly, the joint part has an at least substantially U-shaped cross-section at the location of its connection to the second part, and wherein the joint part in each leg of the U-shaped cross-section is provided with a protrusion provided coaxially with the pivot axis. The protrusions preferably extend inwards on either side of the joint part, wherein the protrusions are at least substantially cylindrical. In the alternative, the protrusions are at least substantially spherical or frusto-conical. Particularly, the recesses are correspondingly shaped.

THE DRAWINGS

The invention will now be explained in more detail with reference to figures illustrated in a drawing, wherein.

DETAILED DESCRIPTION

Figure 1:
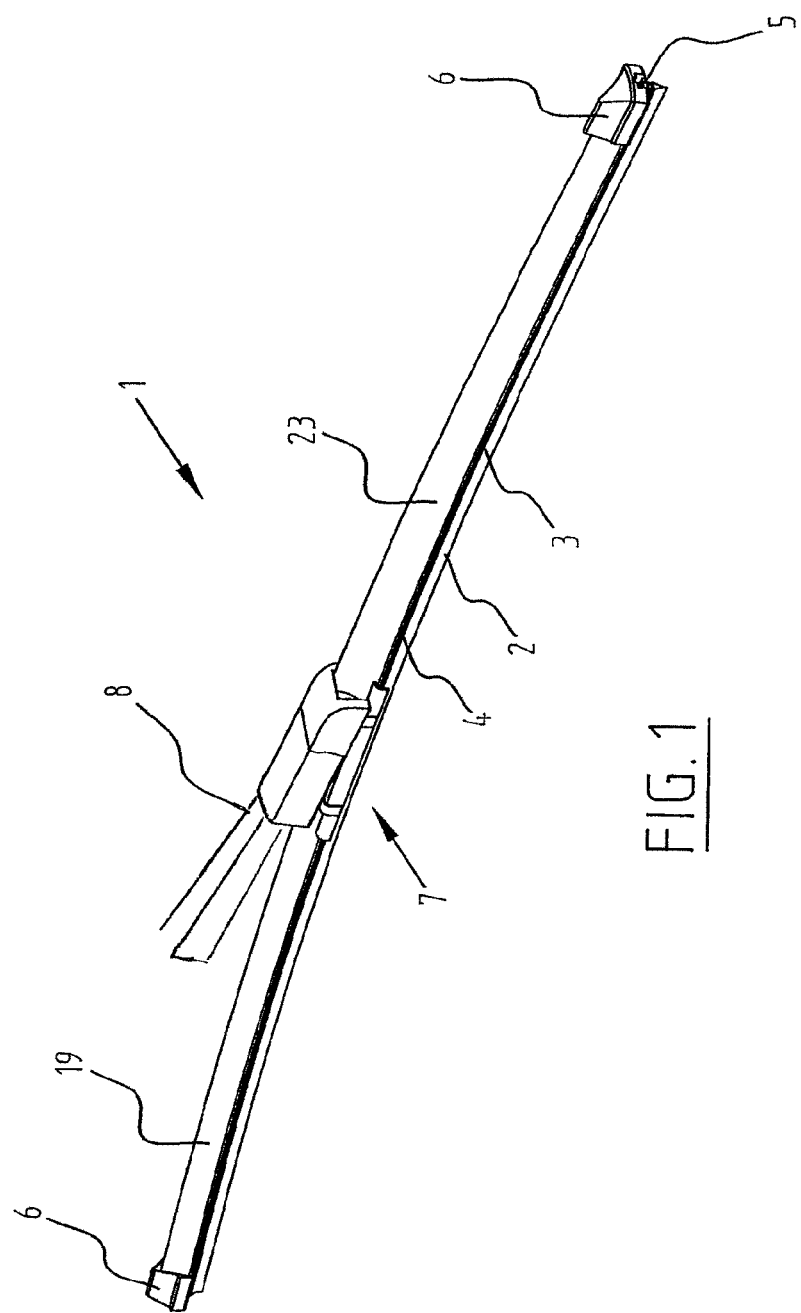
FIG. 1 is a perspective, schematic view of a preferred embodiment of a windscreen wiper device in accordance with the invention.

FIG. 1 shows a preferred variant of a windscreen wiper device 1 according to the invention. The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the wiper blade 2, as it were, which is thus biased in a curved position (the curvature in operative position being that of a windscreen to be wiped).

Neighbouring ends 5 of the strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having a positive fit") or force-locked to the ends 5 of the strips 4. In another preferred embodiment, the connecting pieces 6 are in one piece with the strips 4 made of spring band steel. In the latter case the connecting pieces 6 form transverse bridges for the strips 4, as it were.

The windscreen wiper device 1 is furthermore built up of a connecting device 7 of plastic material for an oscillating arm 8. Alternatively, the connecting device 7 may also be made of metal, such as steel or aluminum. The connecting device 7 is particularly welded, brazed ("soldered"), glued or clamped onto the strips 4. The oscillating arm 8 is pivotally connected to the unit about a pivot axis near one end, as will be described hereunder.

Figure 2A:
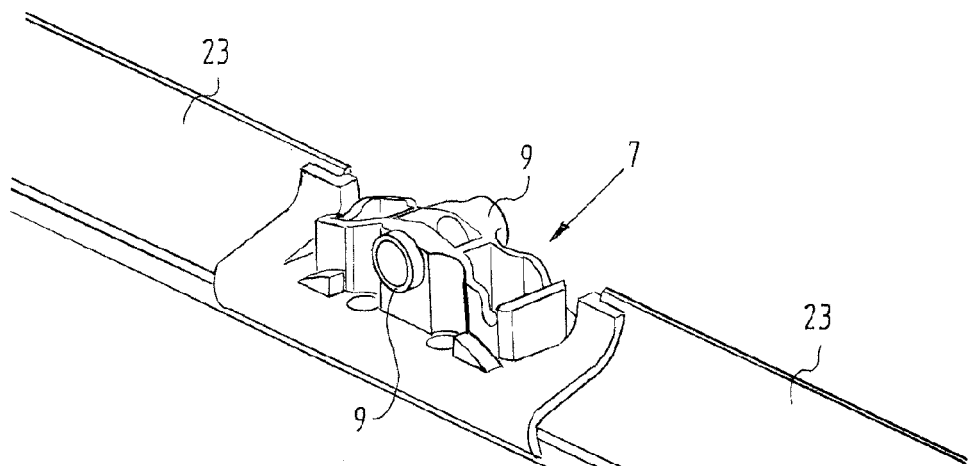
FIG. 2 shows various successive steps for fitting the connecting device, the joint part and the oscillating arm of FIG. 1 together.
Figure 2B:
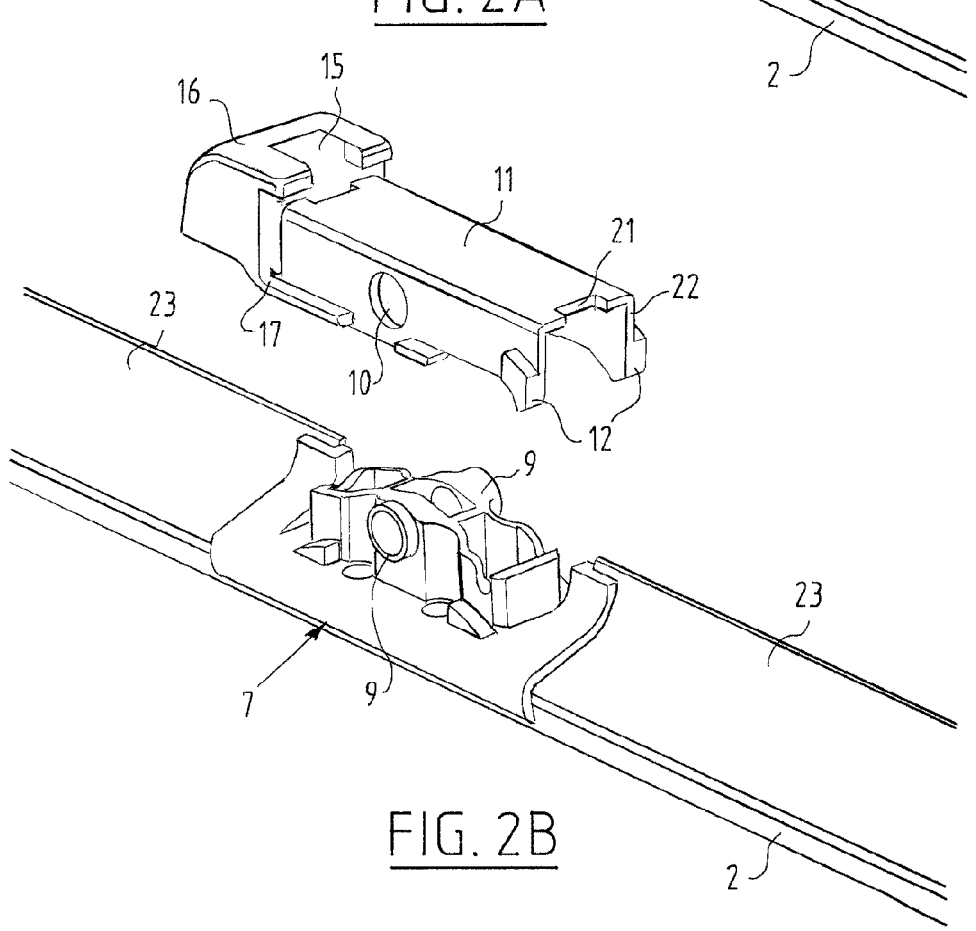
Figure 2C:
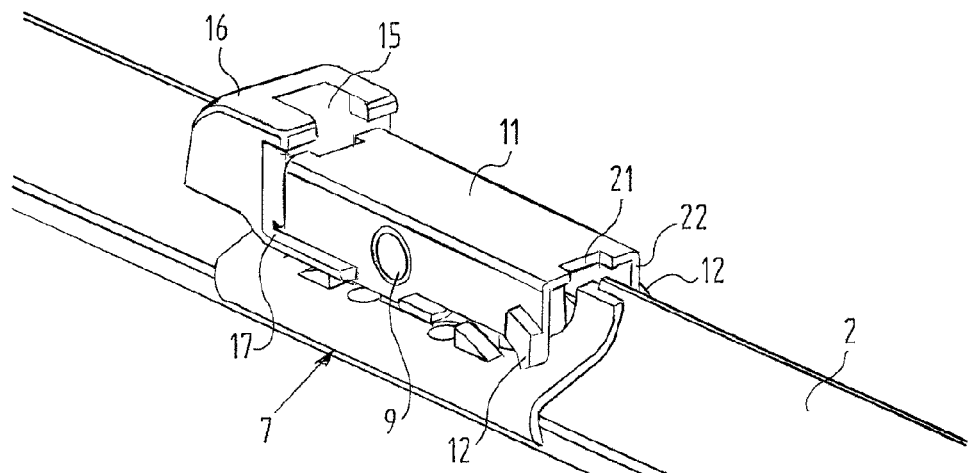
Figure 2D:
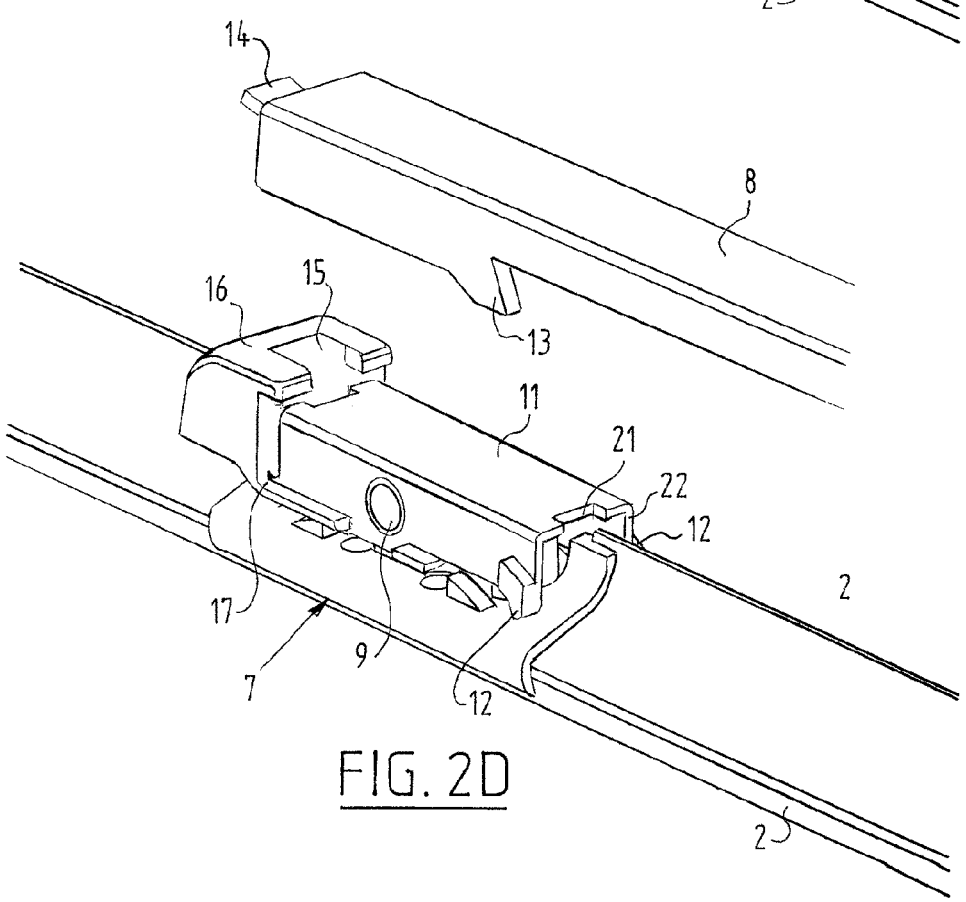
Figure 2E:
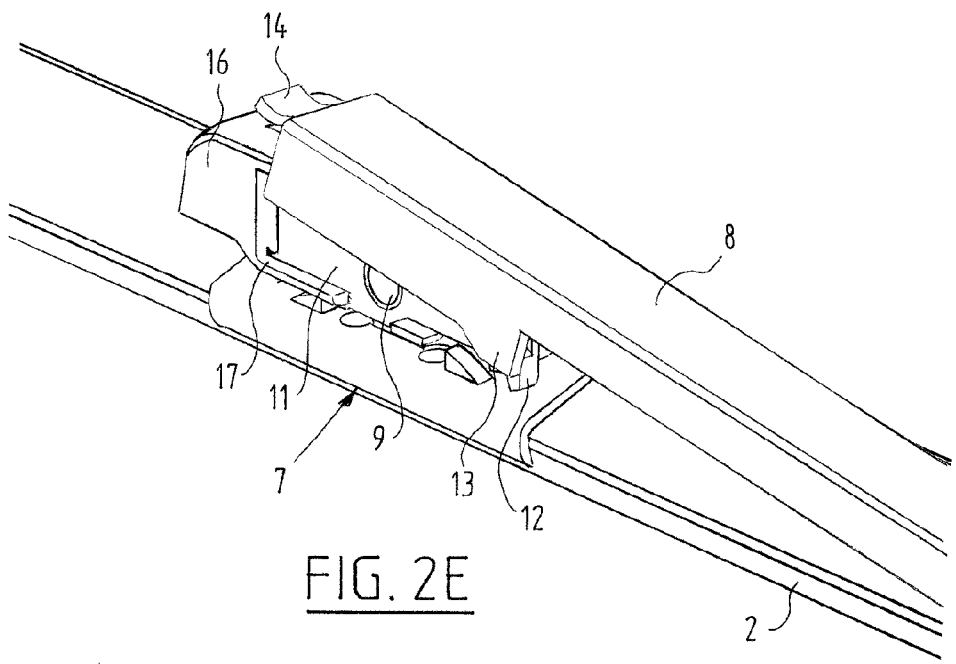
Figure 2F:
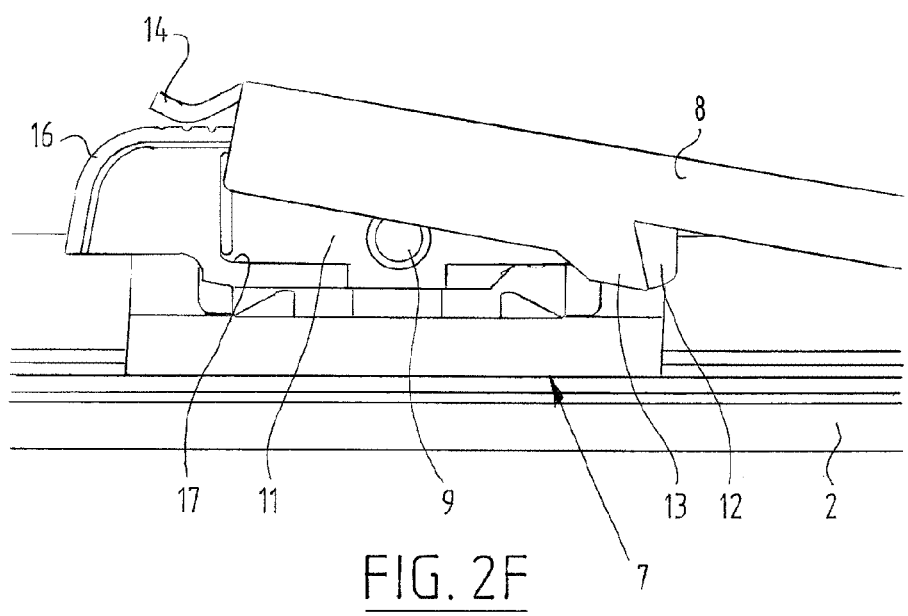
Figure 2G:
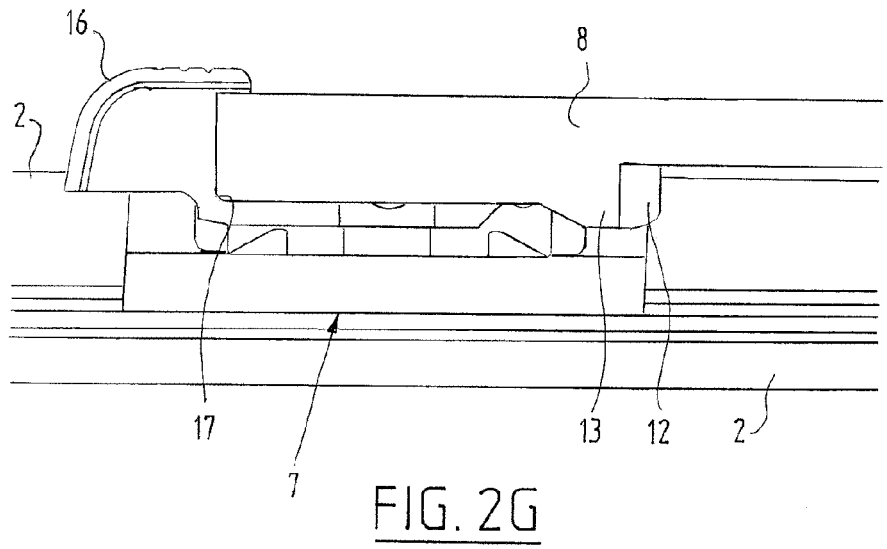
Figure 2H:
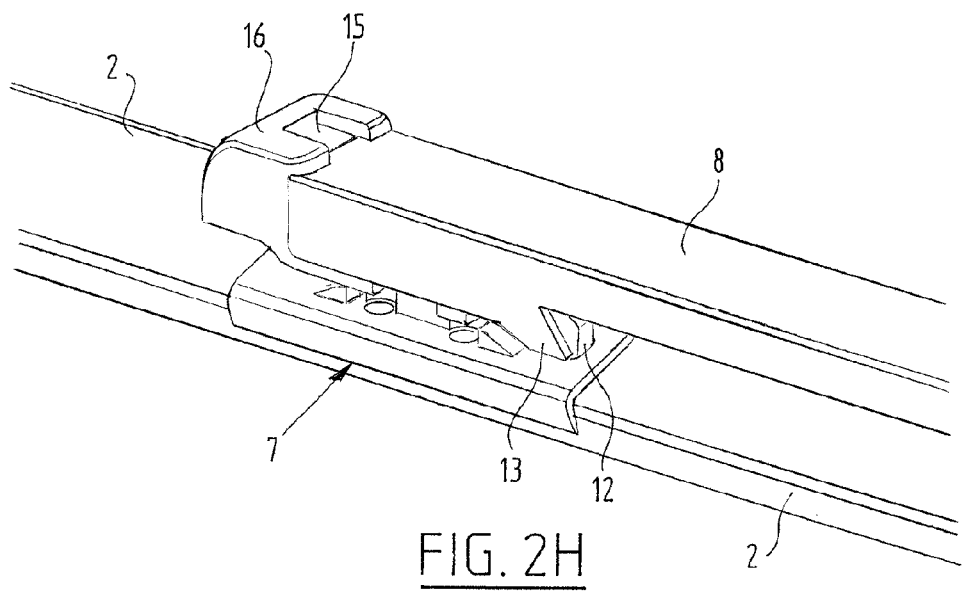
Figure 3A:
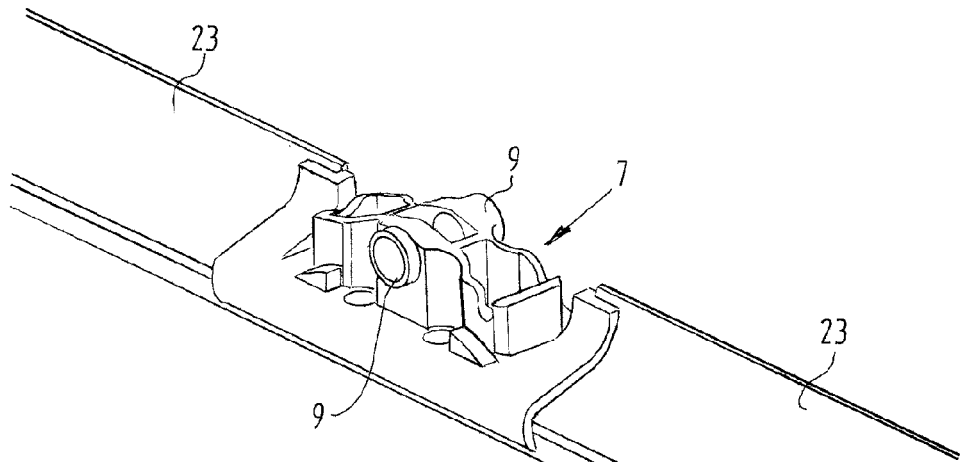
FIG. 3 corresponds to FIG. 2, but now relating to a different type of oscillating arm.
Figure 3B:
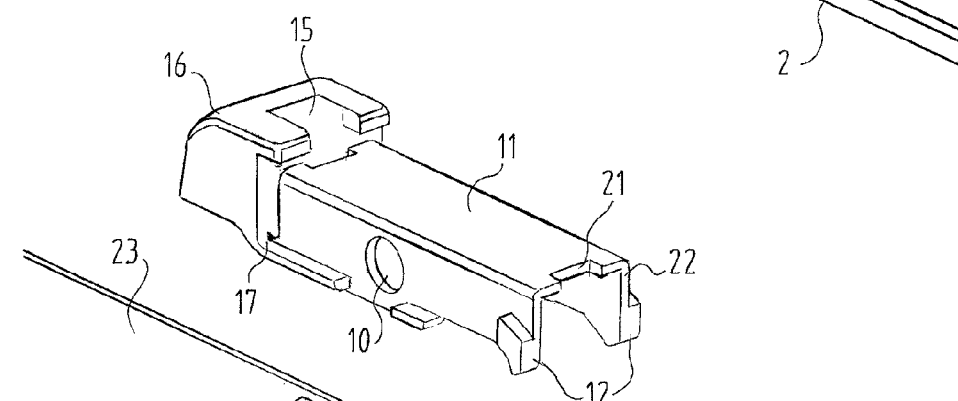
Figure 3C:
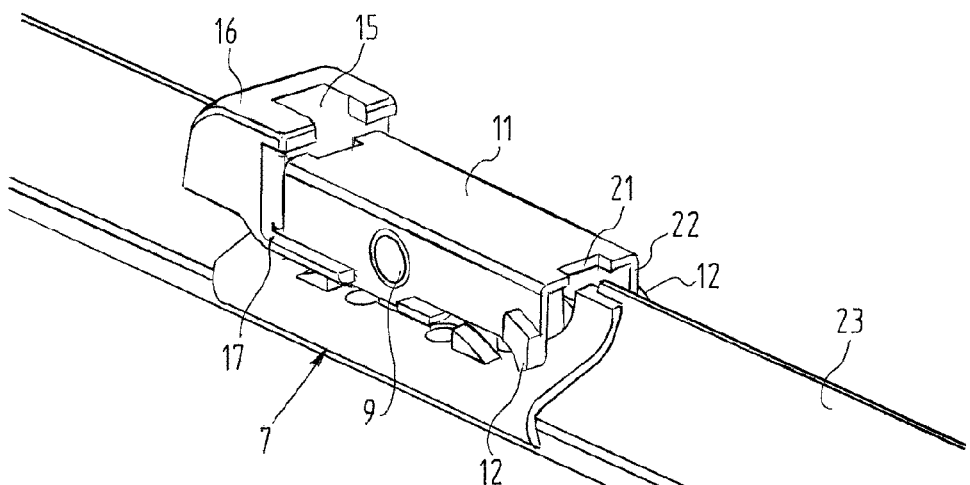
Figure 3D:
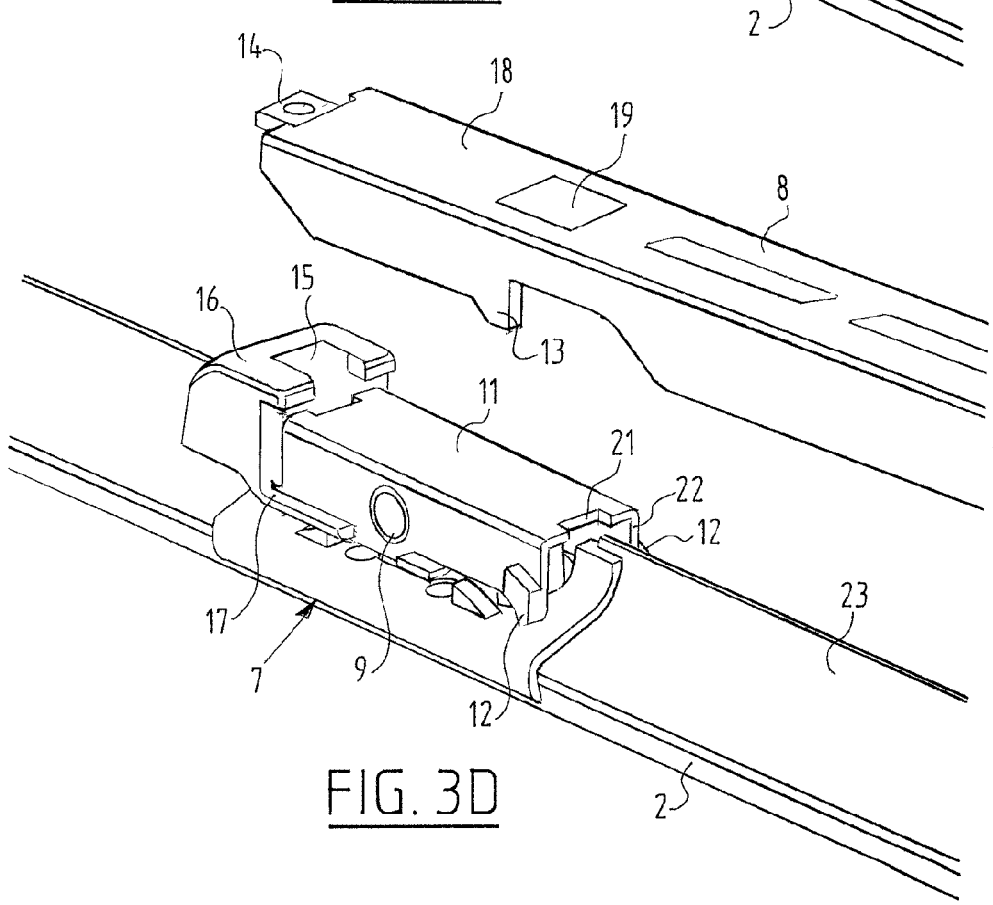
Figure 3E:
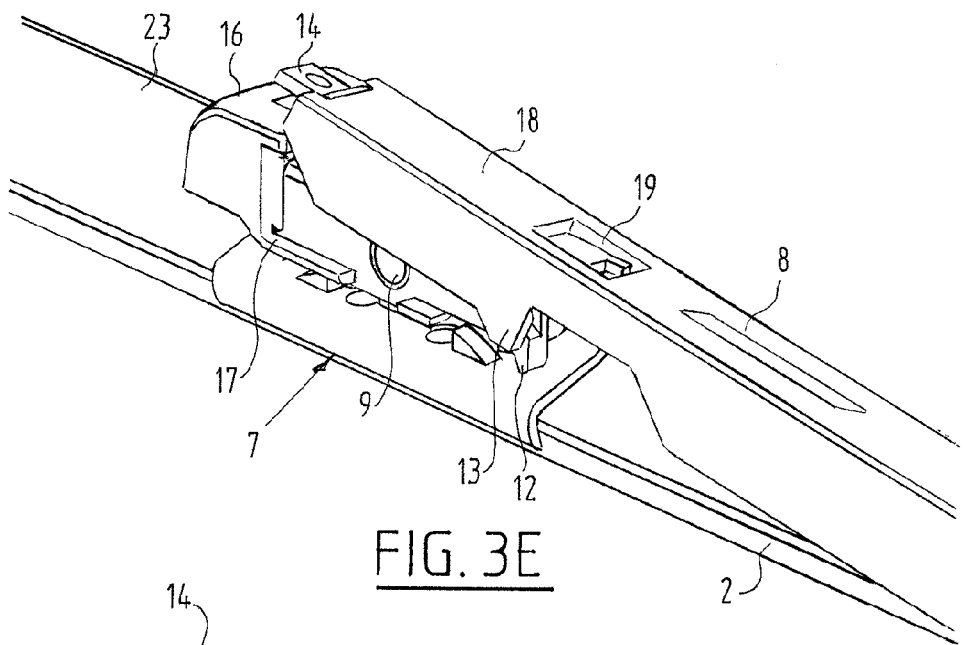
Figure 3F:
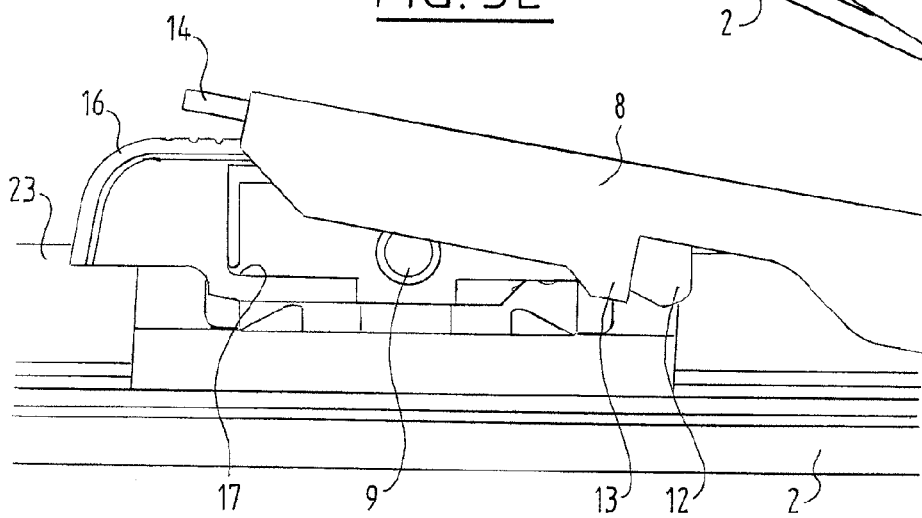
Figure 3G:
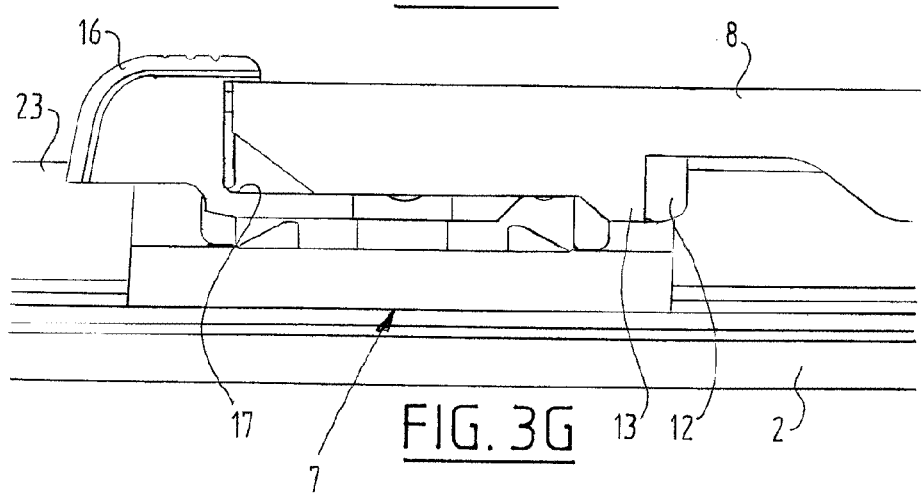
Figure 3H:
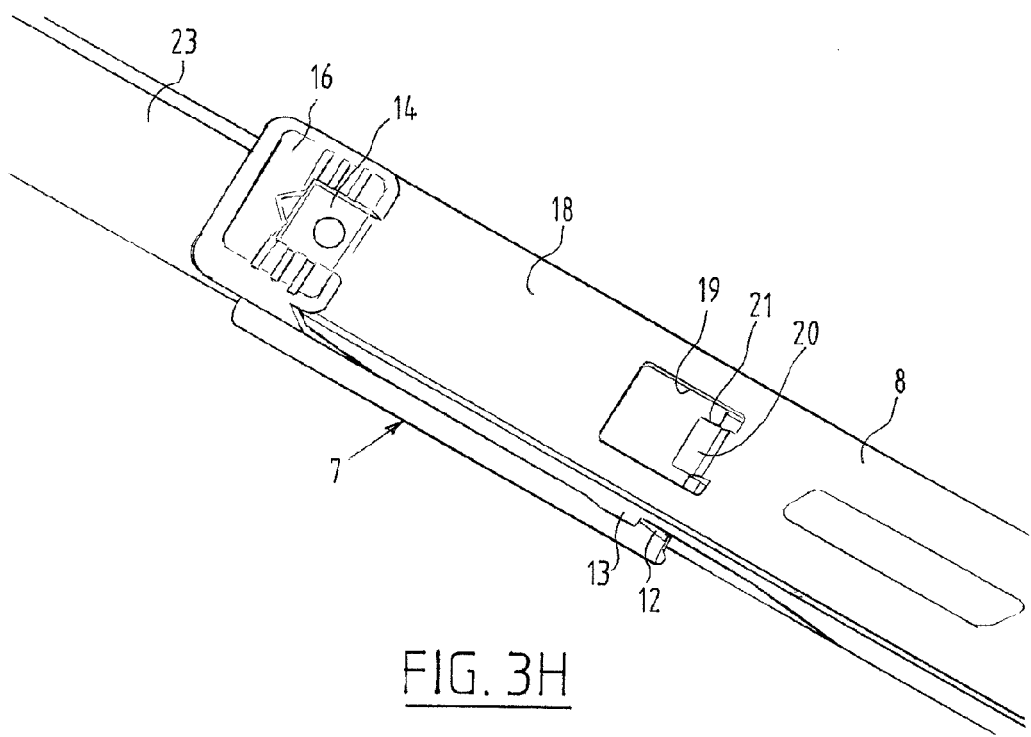

With reference to FIG. 2A the connecting device 7 comprises two cylindrical protrusions 9 extending outwards on either side of the connecting device 7. Alternatively, the protrusions may have a spherical or frusto-conical shape. These protrusions 9 pivotally engage in identically shaped cylindrical recesses 10 of a plastic joint part 11. In the alternative the recesses 10 may have a non-closed shape (i.e. open circumference). The protrusions 9 act as bearing surfaces at the location of a pivot axis in order to pivot the joint part 11 (and the oscillating arm 8 attached thereto) about the pivot axis near one end of the oscillating arm 8. The protrusions 9 are preferably in one piece with the connecting device 7; in the alternative, the protrusions 9 are part of a single pivot pin perpendicular to the connecting device 7.

FIG. 2 shows the steps of mounting the wiper blade 2 onto the oscillating arm 8. Starting with the connecting device 7 being fixedly connected by gluing onto the strips 4 of the wiper blade 2 (FIG. 2A), the joint part 11 is first clipped onto the connecting device 7 (FIGS. 2B and 2C), while the oscillating arm 8 is subsequently pivoted relative to the joint part 11 in an inclined position with respect to the wiper blade 2, so that protrusions 12 each extending sidewards from a longitudinal side of the joint part 11 are hooking behind correspondingly shaped protrusion 13 on the oscillating arm 8 (FIGS. 2D and 2E). As can be seen from FIG. 2, the oscillating arm 8 has an U-shaped cross-section at the location of its connection to the joint part 11, whereas the protrusions 13 each extend downwards from a leg of the U-shaped cross-section. Finally, the oscillating arm 8 may then be pivoted back relative to the joint part 11 in a position parallel to the wiper blade 2 (FIG. 2F). As a consequence thereof a top surface of the free end of the oscillating arm 8 together with a stiff finger 14 will be clipped/snapped in a recess 15 at a free end 16 of the joint part 11, so that the present windscreen wiper device 1 is ready for use (FIGS. 2G and 2H). By a reciprocal movement the wiper blade 2 can be released from the oscillating arm 8. The snapping movement is realized, as the free end 16 of the joint part 12 is made resiliently, so that it can pivot about a hinge axis 17 (FIG. 2F).

FIG. 3 corresponds to FIG. 2, with the difference that the base 18 of the U-shaped cross-section of the oscillating arm 8 is provided with a hole 19 having a closed circumference and being provided with a protrusion 20 extending from an edge of the hole 19 in a direction towards the joint part 11. The protrusion 20 acting as a stop is mounted in a recess 21 provided on the free end 22 of the joint part 11 that abuts the protrusion 20. Accordingly, the stop blocks a longitudinal movement of the wiper blade 2 with respect to the oscillating arm 8.

An important aspect of the invention is that one universal joint part 11 may be used for two different types of oscillating arms 8, namely the one according to FIG. 2 and the other in accordance with FIG. 3.

Possibly, a spoiler 23 is furthermore present being made in one piece with the wiper blade 2.

The invention is not restricted to the variants shown in the drawing, but it also extends to other embodiments that fall within the scope of the appended claims.

The invention claimed is:

1. A yokeless windscreen wiper device comprising an elastic, elongated carrier element, as well as an elongated wiper blade of a flexible material, configured for abutment with a windscreen to be wiped, which the elongated wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which the windscreen wiper device comprises a connecting device for an oscillating arm which has a front edge and a finger which projects forwardly from the front edge, a joint part pivotably connectable to said connecting device at a pivot axis and having a forward free end and a rearward free end, said joint part having an at least substantially U-shaped cross-section including a top wall and two side walls; and wherein a nose of said joint part disposed at said forward end includes a pair of rigid locking tangs and a hinge axis which extends in parallel relationship with and is spaced from said pivot axis, said hinge axis enabling said nose and said rigid locking tangs to hinge forwardly away from said pivot axis in response to an applied pressing force for snappingly receiving the front edge of the arm below said rigid locking tangs, and wherein said locking tangs are spaced laterally from one another on opposite sides of a U-shaped recess for allowing passage of the finger on the wiper arm between said rigid locking tangs to allow said rigid locking tangs to snappingly receive the front edge of the arm below said rigid locking tangs.

2. A windscreen wiper device according to claim 1 wherein said joint part comprises at least one protrusion extending laterally from a longitudinal side of said joint part, said protrusion hooking behind a correspondingly shaped protrusion on the oscillating arm for blocking a longitudinal movement of said wiper blade with respect to the oscillating arm.

3. A windscreen wiper device according to claim 1, wherein said side walls of said joint part each having a protrusion projecting outwardly of said side walls in opposite directions in longitudinally spaced relation to said pivot axis, and spaced still further from said hinge axis and adapted to engage associated features of the arm during and after connection.

4. A windscreen wiper device according to claim 1, wherein said joint part is detachably connected to said connecting device.

5. A windscreen wiper device according to claim 4, wherein said joint part is detachably connected to said connecting device through a snapping/clipping operation.

6. A windscreen wiper device according to claim 1, wherein said joint part is connected to said connecting device by pivotally engaging protrusions of said connecting device, at the location of said pivot axis, in recesses provided in said joint part.

7. A windscreen wiper device according to claim 6, wherein said joint part has an at least substantially U-shaped cross-section at the location of connection to said connecting device, and wherein said joint part in each leg of said U-shaped cross-section is provided with a recess provided coaxially with said pivot axis.

8. A windscreen wiper device according to claim 6, wherein the protrusions extend outwards on either side of said connecting device, and wherein the protrusions are at least substantially cylindrical.

9. A yokeless windscreen wiper device, comprising:
an elongated wiper blade of a flexible material;
an elastic and elongated carrier element biasing said wiper blade into a pre-curved position;
a connecting device for attachment to a wiper arm with a front edge and a finger which projects forwardly from the front edge;
a joint part which is pivotably connectable to said connecting device at a pivot axis and has a forward free end and a rearward free end; and
said joint part having a nose disposed at said forward free end and including a pair of rigid locking tangs which are spaced laterally from one another on opposite sides of a U-shaped recess and a hinge axis which extends in parallel relationship with and is spaced from said pivot axis, said U-shaped recess enabling passage of the finger between said rigid locking tangs, said hinge axis enabling said nose and said rigid locking tangs to hinge forwardly away from said pivot axis in response to an applied pressing force for snappingly receiving a front edge of the wiper arm below said rigid locking tangs.

10. The device of claim 9, wherein said joint part is generally U-shaped in cross section to include a top wall and two side walls, and wherein said side walls each include a protrusion projecting outwardly of said side walls at a location spaced from said pivot axis and spaced still further from said hinge axis.

11. The device of claim 9, wherein there is a recess between said pair of rigid locking tangs.

12. The device of claim 9, wherein said carrier element is fabricated of spring band steel.

13. The device of claim 12, wherein there are two strips of said spring band steel.

14. The device of claim 9, including end caps disposed on opposite ends of said carrier element.

15. The device of claim 14, including a spoiler disposal on top of said carrier and extending between said connecting device and each of said end caps.

* * * * *